US012697859B2

(12) United States Patent
Dobson et al.

(10) Patent No.: US 12,697,859 B2
(45) Date of Patent: Aug. 4, 2026

(54) VEHICLE CANOPY WITH SUPPORT RIBS AND ACCESSORY MOUNTING BOSSES

(71) Applicant: Textron Inc., Providence, RI (US)

(72) Inventors: Kelsey M. Dobson, Augusta, GA (US); Rebecca A. Hassan, Augusta, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 387 days.

(21) Appl. No.: 18/359,421

(22) Filed: Jul. 26, 2023

(65) Prior Publication Data

US 2025/0033447 A1     Jan. 30, 2025

(51) Int. Cl.
*B60J 7/16*          (2006.01)
(52) U.S. Cl.
CPC .................................. B60J 7/1635 (2013.01)
(58) Field of Classification Search
CPC ..................................................... B60J 7/1635
See application file for complete search history.

(56) References Cited

U.S. PATENT DOCUMENTS

| | | | | |
|---|---|---|---|---|
| 4,008,874 A | * | 2/1977 | Conway, Jr. | B60J 11/00 |
| | | | | 280/DIG. 6 |
| 4,037,614 A | * | 7/1977 | Hines | B62D 25/06 |
| | | | | D12/16 |
| 4,308,307 A | * | 12/1981 | Heath | B32B 5/26 |
| | | | | 296/193.11 |
| 4,474,388 A | | 10/1984 | Wagner | |
| 4,819,979 A | | 4/1989 | Moglia | |

| | | | | |
|---|---|---|---|---|
| 5,022,420 A | * | 6/1991 | Brim | A01D 67/02 |
| | | | | 280/47.38 |
| 5,031,713 A | | 7/1991 | Criscuolo | |
| 5,040,763 A | | 8/1991 | Wilson | |
| 5,094,500 A | | 3/1992 | Maypole et al. | |
| 5,190,340 A | | 3/1993 | Nuscher | |
| 5,344,020 A | | 9/1994 | Ferguson | |
| 5,387,010 A | | 2/1995 | Mohr | |
| 5,388,881 A | | 2/1995 | Spencer et al. | |
| 5,411,237 A | | 5/1995 | Dougherty | |

(Continued)

FOREIGN PATENT DOCUMENTS

| | | |
|---|---|---|
| CN | 2342845 Y | 10/1999 |
| CN | 216822088 U | 6/2022 |
| PL | 6077 S2 | 11/2004 |

OTHER PUBLICATIONS

The Toro Company, Distributor Operations Bulletin: Vista Launch, Toro, May 22, 2023, 4 pages, The Toro Company, Bloomington, MN.

(Continued)

*Primary Examiner* — Jonathan Malikasim
(74) *Attorney, Agent, or Firm* — Sandberg Phoenix & Von Gontard P.C.

(57) ABSTRACT

A vehicle canopy, wherein the canopy comprises a main panel having a top face and a bottom face; a front wall extending from a front of the main panel; a back wall extending from a rear of the main panel; a pair of opposing sidewalls extending from opposing sides of the main panel; and one or more support rib integrally formed with the main panel and extending laterally across the main panel, the one or more support rib structured and operable to provide rigidity and stiffness to the main panel to prevent deformation of the main panel within the target zone.

15 Claims, 8 Drawing Sheets

(56) References Cited

U.S. PATENT DOCUMENTS

| | | | | |
|---|---|---|---|---|
| 5,575,500 | A * | 11/1996 | Mimura | B62D 21/15 |
| | | | | 296/187.05 |
| 5,688,018 | A | 11/1997 | Simpson | |
| 5,741,041 | A | 4/1998 | Sullivan | |
| 5,921,609 | A | 7/1999 | Mills | |
| 6,007,134 | A | 12/1999 | Weston | |
| 6,186,584 | B1 * | 2/2001 | Samuelson | B60J 7/08 |
| | | | | 296/213 |
| 6,220,647 | B1 | 4/2001 | Winkler | |
| 6,227,217 | B1 | 5/2001 | Peta | |
| 6,416,109 | B1 | 7/2002 | Tyrer et al. | |
| 6,471,281 | B1 | 10/2002 | Tyrer et al. | |
| 6,481,780 | B2 | 11/2002 | Dolan et al. | |
| 6,601,904 | B2 | 8/2003 | Winkler | |
| 6,663,161 | B1 | 12/2003 | Tyrer | |
| 6,663,162 | B1 | 12/2003 | Tyrer | |
| 6,692,058 | B1 | 2/2004 | Micco | |
| 6,776,445 | B1 | 8/2004 | Conner et al. | |
| 6,805,396 | B2 | 10/2004 | True et al. | |
| 6,869,125 | B2 | 3/2005 | Hamm | |
| 6,883,846 | B2 * | 4/2005 | Cheek | B60J 7/08 |
| | | | | 296/213 |
| 7,093,883 | B2 | 8/2006 | Tyrer | |
| 7,100,662 | B2 | 9/2006 | Nation | |
| 7,175,223 | B1 | 2/2007 | Tyrer | |
| 7,210,492 | B2 | 5/2007 | Gerrie et al. | |
| 7,431,377 | B2 | 10/2008 | Tyrer | |
| 7,448,666 | B2 | 11/2008 | Tyrer | |
| 7,823,956 | B2 | 11/2010 | Jones et al. | |
| 8,069,899 | B2 | 12/2011 | Nation | |
| 8,845,004 | B2 | 9/2014 | Devoss | |
| 9,045,022 | B2 | 6/2015 | Tyrer | |
| 9,061,568 | B2 | 6/2015 | O'Flynn | |
| 9,333,840 | B1 | 5/2016 | Pino | |
| 10,398,953 | B2 | 9/2019 | Klevana et al. | |
| 10,525,805 | B2 | 1/2020 | Seitz et al. | |
| 10,661,721 | B2 | 5/2020 | Tyrer | |
| 11,142,042 | B2 * | 10/2021 | Russ | B60H 1/00407 |
| 11,285,789 | B2 * | 3/2022 | Held | B60J 5/06 |
| 2002/0145095 | A1 | 10/2002 | Winkler | |
| 2006/0119129 | A1 | 6/2006 | Winkler | |
| 2006/0219278 | A1 | 10/2006 | Lohman | |
| 2008/0174143 | A1 | 7/2008 | Showalter | |
| 2011/0303371 | A1 | 12/2011 | Harrison | |
| 2021/0252355 | A1 | 8/2021 | Tyrer et al. | |
| 2022/0266918 | A1 * | 8/2022 | Zaremba | B60R 11/00 |

OTHER PUBLICATIONS

The Toro Company, Vista Series: Passenger Vehicles, Toro, May 2023, 2 Pages, The Toro Company, Bloomington, MN.

The Toro Company, Vista Lithium Shuttle Vehicle Operator's Manual, Toro, 2023, 44 Pages, The Toro Company, Bloomington, MN.

The Toro Company, Vista 4 Passenger Lithium Shuttle Vehicle Parts Catalog, Toro, 2023, 40 Pages, The Toro Company, Bloomington, MN.

* cited by examiner

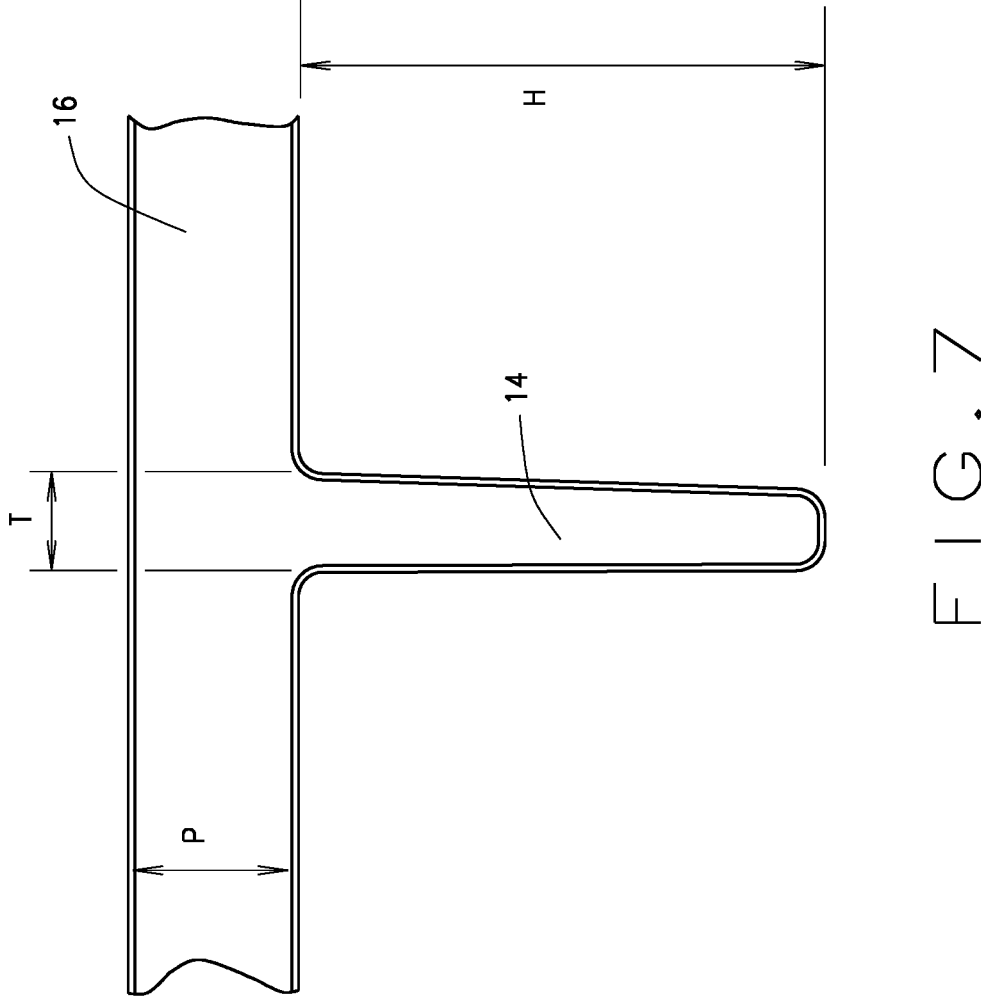
F I G . 7

VEHICLE CANOPY WITH SUPPORT RIBS AND ACCESSORY MOUNTING BOSSES

FIELD

The present teachings relate to vehicle canopies or tops, and more particularly to support structure and accessory mounting on vehicle canopies or tops

BACKGROUND

The statements in this section merely provide background information related to the present disclosure and may not constitute prior art.

Many known lower speed vehicles such golf cars, passenger transport or shuttle vehicles, maintenance or ground care utility vehicles, turf mowers, cargo vehicles, all-terrain vehicles (ATVs), utility-terrain vehicle (UTVs), worksite vehicles, a buggies, etc. often come equipped with a canopy that is structured and operable to protect passengers of the vehicle from rain, water and sun, and to channel or direct water or rain or other liquid away from the passenger compartment. Some such known canopies are designed with a curved or domed shape or profile whereby the curved/domed shape acts as a self-supporting structural element to maintain the shape of the canopy without the needed for additional support structure. Other such known canopies have a substantially flat or minimally domed shape or profile. Such substantially flat and minimally domed canopies are known to sag, bow, warp or otherwise deform due to exposure to changing temperatures from the heat of the sun to cooler temperatures after the sun goes down and in cooler weather. To address the problem of sagging, bowing, warping or otherwise deforming many known canopy manufactures add secondary structural support to the canopies in form of metal (e.g., aluminum) or other (e.g., polycarbonate) support beams that are bolted, screwed or otherwise connected to and mounted to the underside of the canopy. Additionally, attaching accessories, such as a console, a headliner, a speaker, a computer tablet, etc., to known canopies requires drilling holes into the canopy and attaching the accessory or nut and bolt hardware or using self-tapping screws drilled in hollow gas channels of the molded canopy.

SUMMARY

In various embodiments, the present disclosure provides a vehicle canopy, wherein the canopy comprises a main panel having a top face and a bottom face, a front wall extending from a front of the main panel, a back wall extending from a rear of the main panel, a pair of opposing sidewalls extending from opposing sides of the main panel, and one or more support rib integrally formed with the main panel and extending laterally across the main panel, the one or more support rib structured and operable to provide rigidity and stiffness to the main panel to prevent deformation of the main panel within the target zone.

In various other embodiments the present disclosure provides a canopy system for a vehicle, wherein the canopy system comprises at least one front strut, at least one rear strut, and a canopy that is mountable to the at least one front strut and the at least one rear strut. In various embodiments canopy comprises a main panel having a top face and a bottom face, a front wall extending from a front of the main panel, a back wall extending from a rear of the main panel, a pair of opposing sidewalls extending from opposing sides of the main panel, and one or more support rib integrally formed with the main panel and extending laterally across the main panel, the one or more support rib structured and operable to provide rigidity and stiffness to the main panel to prevent deformation of the main panel within the target zone.

In yet other embodiments, the present disclosure provides a vehicle, wherein the vehicle comprises a chassis, a plurality of wheels operatively connected to the chassis, a passenger compartment supported by the chassis, and a canopy system structured and operable to protect passengers of the vehicle from rain, water and sunlight. The canopy system generally comprises at least one front strut, at least one rear strut, and a canopy that is mountable to the at least one front strut and the at least one rear strut. In various embodiments canopy comprises a main panel having a top face and a bottom face, a front wall extending from a front of the main panel, a back wall extending from a rear of the main panel, a pair of opposing sidewalls extending from opposing sides of the main panel, and one or more support rib integrally formed with the main panel and extending laterally across the main panel, the one or more support rib structured and operable to provide rigidity and stiffness to the main panel to prevent deformation of the main panel within the target zone.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 7 exemplarily illustrates a lateral cross-section of an exemplary support rib in accordance with various embodiments of the present disclosure.

Figure 8:
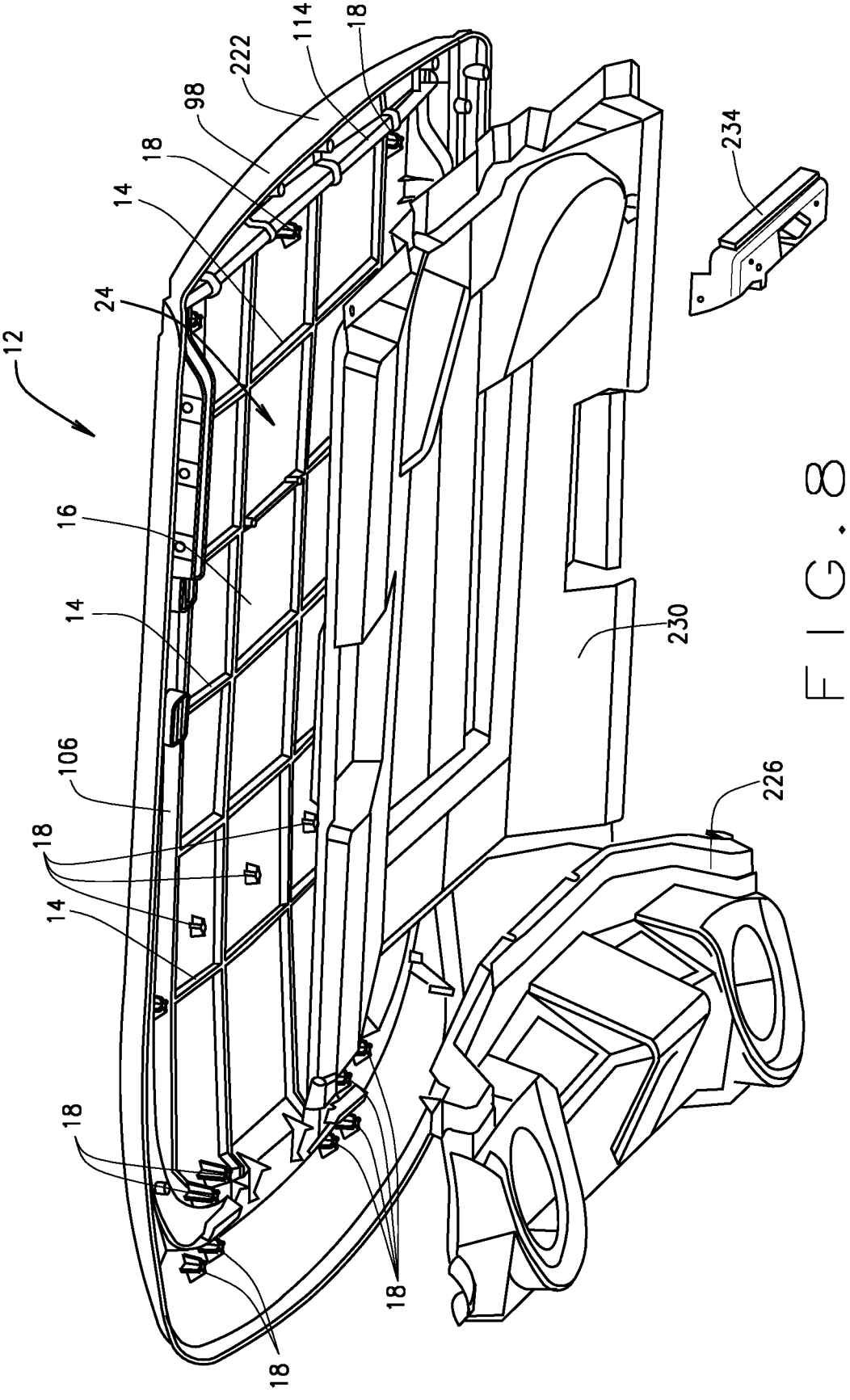

FIG. 8 is an exemplary exploded view of the canopy and a plurality of accessories that are mountable to the accessory mounting bosses, in accordance with various embodiment of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 1:
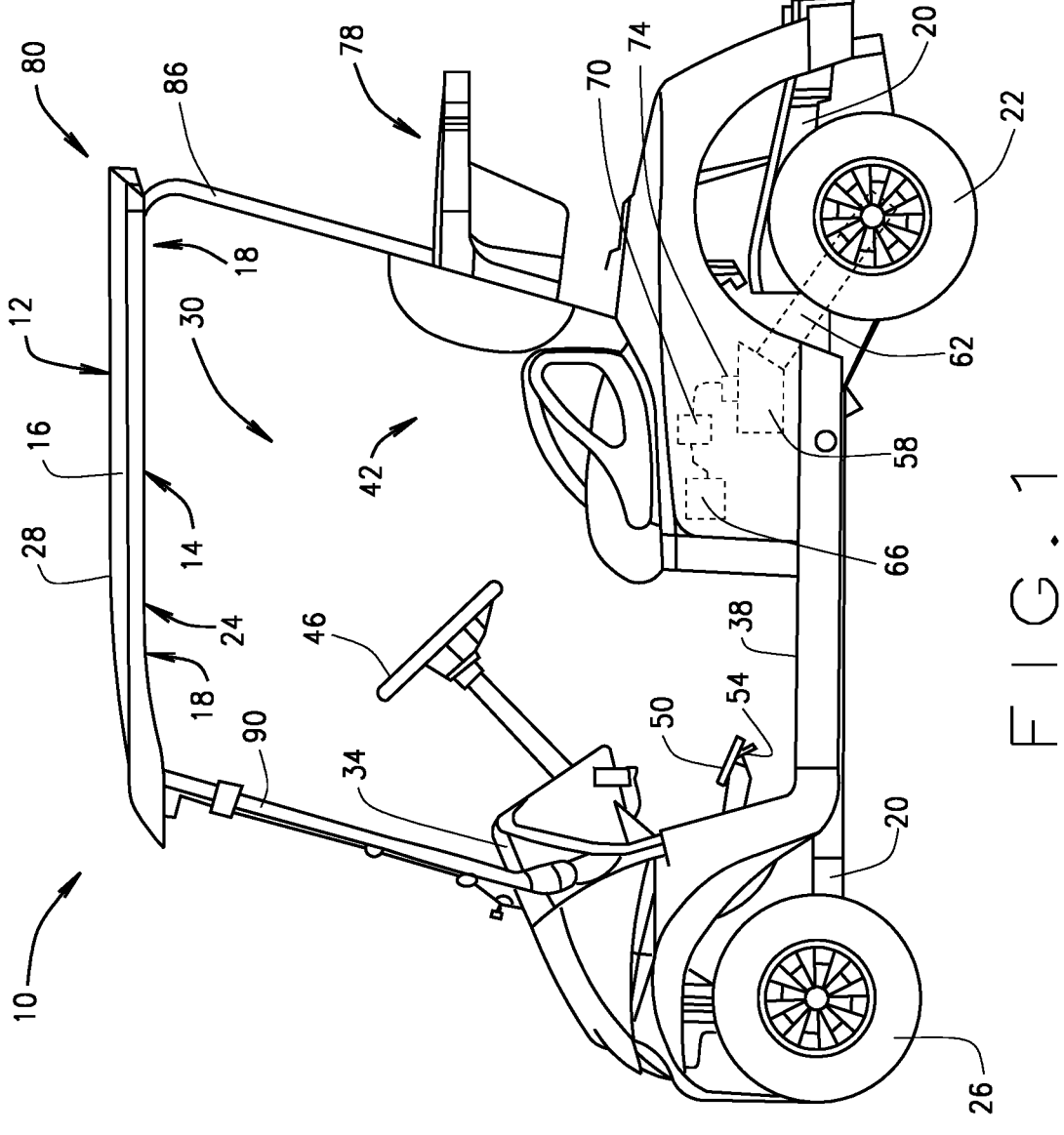
FIG. 1 is an exemplary side view of a vehicle comprising a canopy having one or more integrally formed support rib and/or a plurality of accessory mounting bosses, in accordance with various embodiments of the present disclosure.
Figure 2:
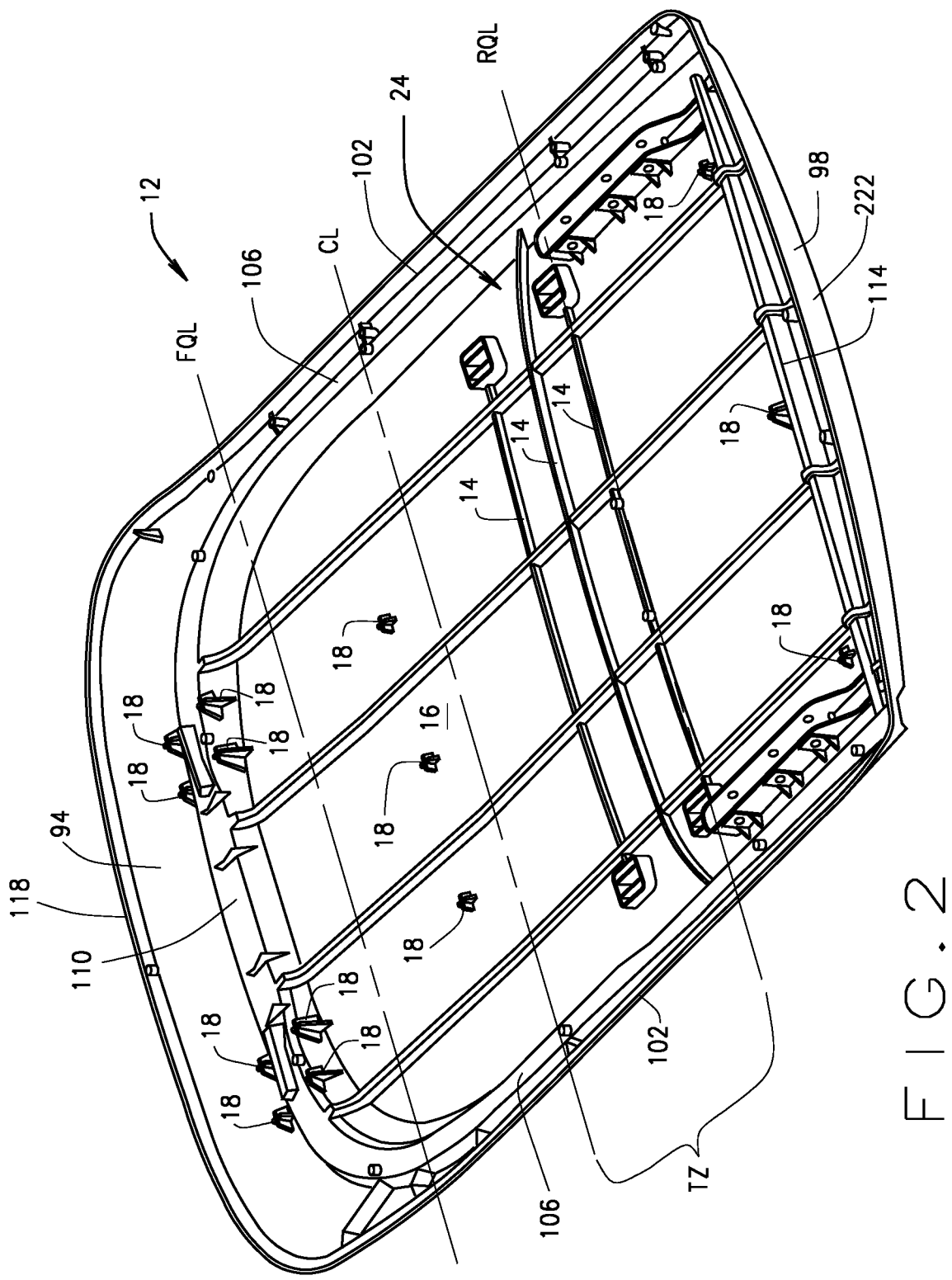
FIG. 2 is a view of an underside of the canopy exemplarily illustrating the support rib(s) in accordance with various embodiments of the present disclosure.
Figure 3:
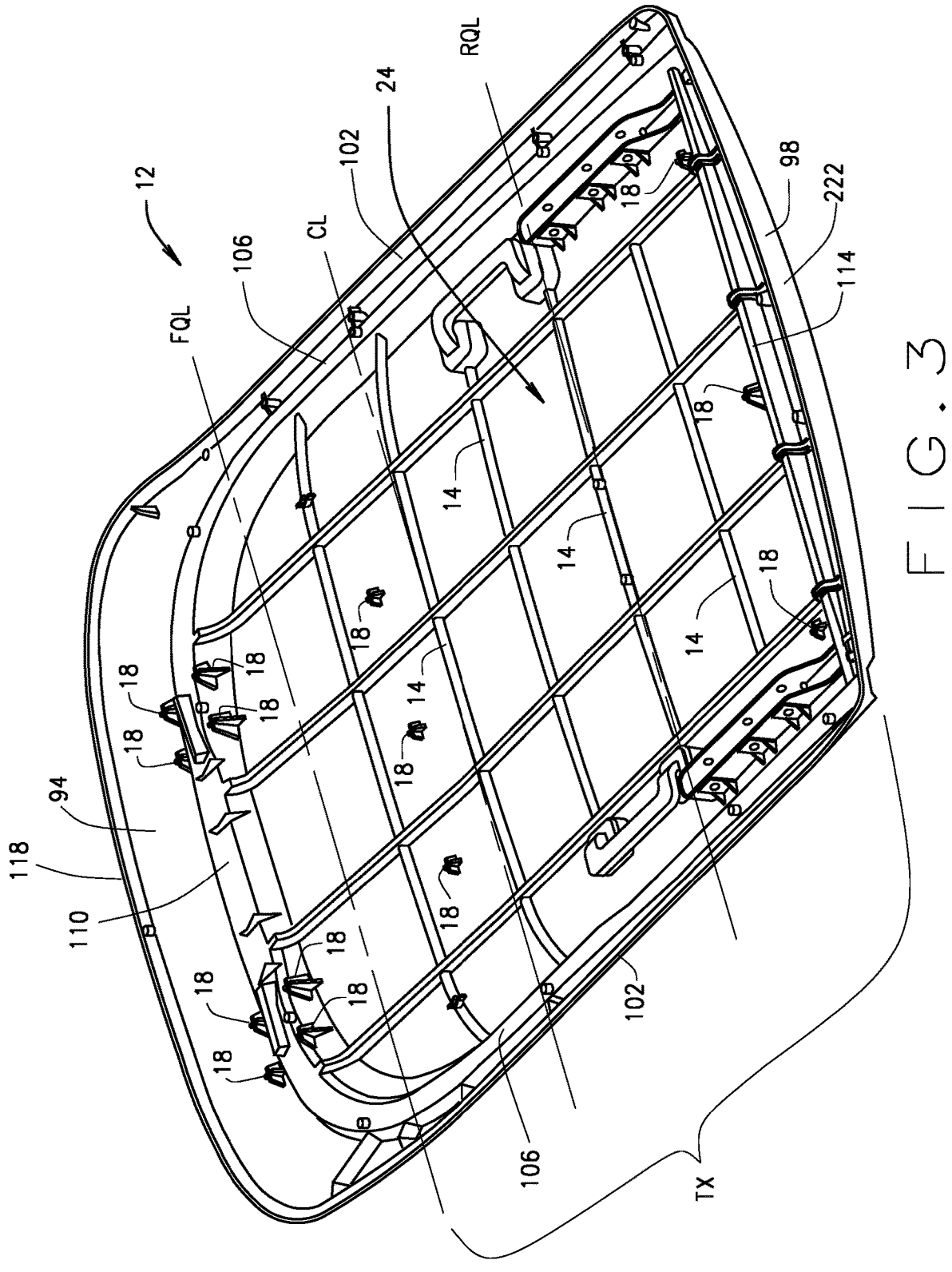
FIG. 3 is a view of an underside of the canopy exemplarily illustrating the support rib(s) shown in accordance with various other embodiments of the present disclosure.
Figure 4:
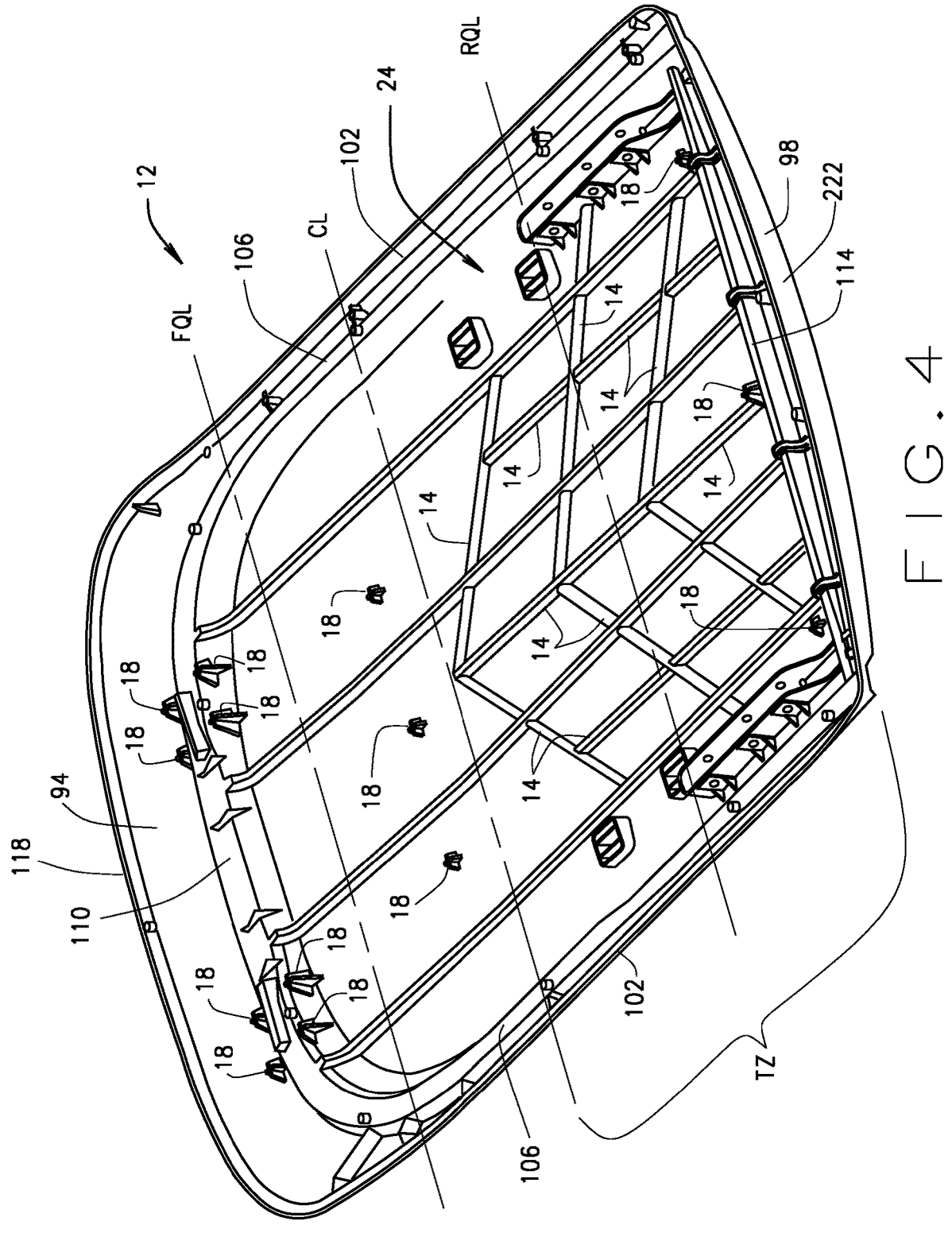
FIG. 4 is a view of an underside of the canopy exemplarily illustrating the support rib(s) in accordance with yet other various embodiments of the present disclosure.
Figure 5:
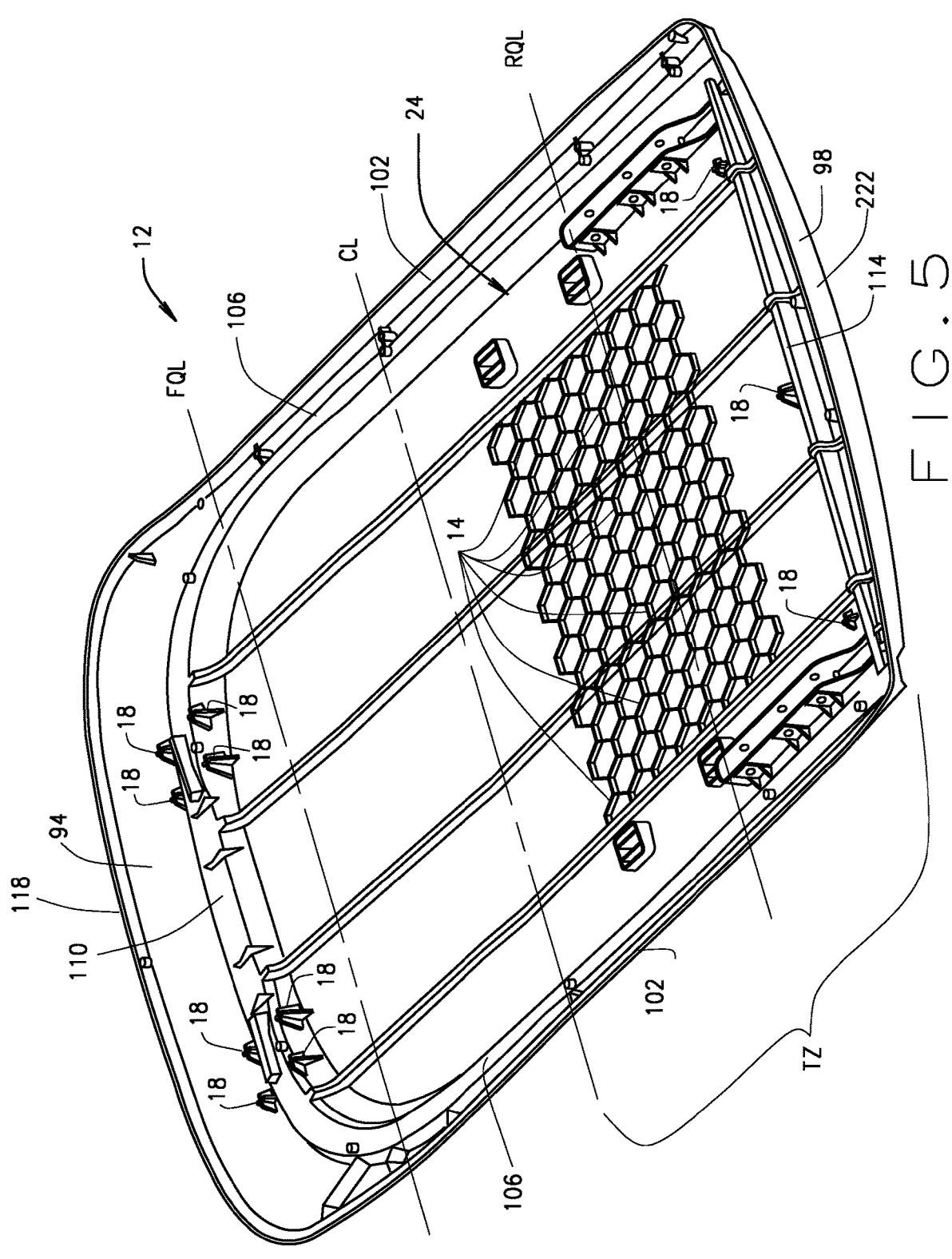
FIG. 5 is a view of an underside of the canopy exemplarily illustrating the support rib(s) in accordance with still other various embodiments of the present disclosure.

Referring now to FIG. 1, the present disclosure generally provides a vehicle 10, comprising a canopy 12 having one or more integrally formed support rib 14 that is/are molded into, or otherwise integrally formed with, a main panel 16 of the canopy 12. The support rib(s) 14 can be integrally formed with a bottom face 24 or a top face 28 of the main panel 16. However, for clarity and simplicity the support rib(s) 14 will be exemplarily illustrated throughout the various figures as being integrally formed with the bottom face 24 of the canopy main panel 16. The support rib(s) 14 are structured and operable to add structural integrity, rigidity and stiffness to the main panel 16 such that the main panel 16 (i.e., the canopy 12) will not sag, bow, warp or otherwise deform due to exposure to changing environmental temperatures such as heat changes from the sun to cooler temperatures after the sun goes down and/or when the weather is cooler or cold. In various embodiments the main panel 16 is substantially flat having a substantially flat lateral cross sectional profile. In alternatively embodiments the main panel 16 is slightly domed having a slightly arched lateral cross sectional profile.

In various embodiments, the canopy 12 can further include a plurality of integrally formed accessory mounting bosses 18 that are molded into, or otherwise integrally formed with, the main panel 16 of the canopy 12. The accessory bosses 18 can be integrally formed with the bottom face 24 or the top face 28 of the main panel 16, but for clarity and simplicity will be exemplarily illustrated throughout the various figures as being integrally formed with the bottom face 24. The accessory bosses 18 are structured and operable to provide an accurate location placement and connection means for accurately locating and mounting one or more accessory, such as a console, a headliner, a speaker, a computer tablet, etc., to the canopy 12 (i.e., to the main panel 16).

Although the vehicle 10 is exemplarily illustrated in the various figures as a golf car and will be exemplarily described herein with regard to a golf car, the vehicle 10 can be any vehicle having a canopy (e.g., canopy 12) and remain within the scope of the present disclosure. For example, it is envisioned that the vehicle 10 can be a golf car, a passenger transport or shuttle vehicle, a maintenance or ground care utility vehicle, a turf mower, a cargo vehicle, an all-terrain vehicle (ATV), a utility-terrain vehicle (UTV), a worksite vehicle, a buggy, or any other vehicle.

The vehicle 10 generally includes a chassis or frame 20, a pair of rear wheels 22 and a pair of front wheels 26 operationally connected to the chassis 20, and a passenger compartment 30. The passenger compartment 30 generally includes an instrument panel or dash console 34, a floorboard 38, and a passenger seating structure 42. The instrument panel/dash console 34 can include one or more instrument displays, gauges, vehicle control devices and/or storage compartments. The passenger compartment 30 additionally includes a steering wheel 46 for use by the passenger/user to control the directional movement of the vehicle 10, a brake pedal 50 for use by the passenger/user to control slowing and stopping of the vehicle 10, and an accelerator pedal 54 for use by the operator to control the torque delivered by a prime mover 58 to one or more of the rear and/or front wheels 22 and/or 26. Particularly, the prime mover 58 is operatively connected to a drivetrain 62 that is operatively connected between the prime mover 58 and at least one of the rear and/or front wheels 22 and/or 26.

The vehicle 10 further comprises a vehicle electrical power source 66 (e.g., one or more battery) that is structured and operable to provide electrical power to various electrical components of the vehicle 10 (e.g., an electric motor prime mover, and other vehicle electrically operated modules and components), and a vehicle main control module 70 that is communicatively (wired or wirelessly) connected to a computer-based prime mover control unit (PMCU) 74. The PMCU 74 is structured and operable to control various operations of the vehicle prime mover 58 such as air/fuel ratio, spark timing and engine speed (e.g., RPM if the prime mover 58 is an internal combustion engine, and motor speed and torque output if the prime mover 58 is an electric motor). The vehicle main control module 70 is structured and operable to communicate with the PMCU 74 and control various other vehicle modules, devices and operations. The prime mover 58 can be any device that is structured and operable to generate torque (e.g., motive force, e.g., power) utilized to provide motive force for the vehicle 10 via the drivetrain 62. For example, in various embodiments, the prime mover 58 can be an internal combustion engine (ICE), an electric motor, a hybrid combination of an ICE and an electric motor, or any other suitable motive power source and remain within the scope of the present disclosure. Operation of the prime mover 58 is generally controlled by PMCU 74 to generate torque (e.g., motive force, e.g., power) utilized to provide motive force for the vehicle 10 via the drivetrain 62. For example, in various embodiments wherein the prime mover 58 is an internal combustion engine the PMCU 74 can control engine speed and torque output by controlling a fuel/air mixture ratio and/or a spark ignition timing of the engine. Or, for example, in various embodiments wherein the prime mover 58 is an electric motor, the PMCU 74 can control the amount of voltage provided to the motor from the electrical power source 66.

In various embodiments, the canopy 12 is part of a canopy system 80 mounted to the vehicle 10 and disposed over and around the passenger compartment 30. The canopy system 80 generally comprises at least one rear strut, column or pillar 86 that is mountable to a rear deck and/or the chassis 20 and/or other rearward structure of the vehicle 10, at least one front strut, column or pillar 90 that is mountable to a front cowl and/or the chassis 20 and/or other forward structure of the vehicle 10. The canopy 12 is mounted to the front strut(s), column(s) or pillar(s) 90 and the rear canopy front strut(s), column(s) or pillar(s) 86, whereby it is disposed above the passenger compartment 30.

Referring now to FIGS. 2 through 7, as described above the canopy 12 comprises the main panel 16. The canopy 12 additionally includes a front wall 94 integrally formed with, extending from and disposed laterally across a front of the main panel 16, a rear wall 98 integrally formed with, extending from and disposed laterally across a rear of the main panel 16, and a pair of opposing sidewalls 102 integrally formed with, extending from and disposed longitudinally along opposing sides of the main panel 16. In various embodiments the canopy 12 can further include opposing longitudinal side water channels 106 disposed and integrally formed between the opposing sidewalls 102 and the main panel 16, a forward lateral water channel 110 integrally formed between the front wall 94 and the main panel 16 and fluidly connected to the side water channels 106, and a rearward lateral water channel 114 integrally formed between the rear wall 98 and the main panel 16 and fluidly connected to the side water channels 106. The water channels 106, 110 and 114 are structured and operable to receive water shed from the top face 28 of the main panel and channel and direct the flow of water such that the water will exit the canopy away from the passenger compartment 30.

As described above, the canopy 12 comprises one or more integrally formed support rib 14 that is/are molded into, or otherwise integrally formed with, the main panel 16 of the canopy 12. For example, in various embodiments, the support rib(s) 14 can be integrally formed with the bottom face of the main panel 16. As also described above, the support rib(s) 14 is/are structured and operable to provide structural integrity, rigidity and stiffness to the main panel 16 such that the main panel 16 (i.e., the canopy 12) will not sag, bow, warp or otherwise deform due to exposure to changing environmental temperatures. At least some known canopies are known to sag, bow, warp or otherwise deform in certain particular areas, regions or zones of the canopy. Therefore, in various embodiments, the canopy 12 is fabricated (e.g., molded or additive manufactured) such that the support rib(s) 14 are integrally formed and disposed in a certain particular target zone TZ corresponding to the areas, regions or zones of the canopy where known canopies are known to sag, bow, warp or otherwise deform due to environmental temperatures. The target zone can be any identified and defined area, region or zone of the canopy 12 where it is envisioned that additional support to prevent sagging, bowing, warping or otherwise deforming is needed.

In various embodiments, the target zone TZ extends laterally across at least a portion of or the entire width of the canopy 12 and lies within certain longitudinal zones of the canopy 12. More specifically, the canopy 12 can include a longitudinal center axis or line CL that is centered between a front or distal end 118 of the canopy 12 (i.e., a forwardmost edge of the front wall 94) and a rear or proximal end 222 of the canopy 12 (i.e., a rearward most edge of the back wall 98). The canopy 12 can further include a longitudinal front quarter axis or line FQL that is centered between the front or distal end 118 of the canopy 12 and the center line CL of the canopy 12, and a longitudinal rear quarter axis or line RQL that is centered between the center line CL and the rear or proximal end 222 of the canopy 12. In various embodiments, the target zone TZ can be disposed between the center line CL and the rear quarter line RQL, as exemplarily illustrated in FIG. 2. In other embodiments, the target zone TZ can be disposed between front quarter line FQL and the proximal end 222 of the canopy 12, as exemplarily illustrated in FIGS. 3 and 6. In yet other embodiments, the target zone TZ can be disposed between center line CL and the proximal end 222 of the canopy 12, as exemplarily illustrated in FIGS. 4 and 5. In still other embodiments, the target zone TZ can be disposed between the front quarter line FQL and the rear quarter line RQL of the canopy 12, or between the distal end 118 and the front quarter line FQL of the canopy 12, or between the distal end 118 and center line CL of the canopy 12, or between the distal end 118 and the rear quarter line RQL of the canopy 12, or between the distal end 118 and proximal end 222 of the canopy 12, or between the rear quarter line RQL and the proximal end 222 of the canopy, or any other identified and defined area, region or zone of the canopy 12 where it is envisioned that additional support to prevent sagging, bowing, warping or otherwise deforming is needed.

As described above, the canopy 12 comprises one or more integrally formed support rib 14 that is/are molded into or otherwise integrally formed with the main panel 16 of the canopy 12. For example, in various embodiments, the canopy 12 can comprise one integrally formed support rib 14, or two or more integrally formed support ribs 14, or three or more integrally formed support ribs 14, or four or more integrally formed support ribs 14, or any desired number of support ribs 14. For example, as exemplarily illustrated in FIG. 2, in various embodiments the canopy 12 can comprise three support ribs 14 integrally formed with the main panel 16 and disposed within a target zone TZ that lies between the center line CL and the rear quarter line RQL of the canopy 12. Or, as exemplarily illustrated in FIG. 3, in various embodiments the canopy 12 can comprise five support ribs 14 integrally formed with the main panel 16 and disposed within in a target zone TZ that lies between the front quarter line FQL and the proximal end 222 of the canopy 12. Or, as exemplarily illustrated in FIG. 4, in various embodiments the canopy 12 can comprise three support ribs 14 integrally formed with the main panel 16 and disposed within in a target zone TZ that lies between the center line CL and the proximal end 222 of the canopy 12. Or, as exemplarily illustrated in FIG. 5, in various embodiments the canopy 12 can comprise greater than five support ribs 14 integrally formed with the main panel 16 and disposed within in a target zone TZ that lies between the center line CL and the proximal end 222 of the canopy 12. Although the support ribs 14 are shown throughout the various figures as being substantially spaced apart from each other, it is envisioned that the support ribs 14 can have any desired spacing pattern or configuration relative to each other and remain with the scope of the present disclosure.

Moreover, the rib(s) 14 can be integrally formed with canopy 12 to have any desired shape, pattern or configuration of disposition across and within the target zone TZ. For example, in various embodiments, the rib(s) 14 can be integrally formed within the target zone TZ to have a generally straight line configuration as exemplarily illustrated in FIGS. 2, 3 and 6. Or, in various embodiments, the rib(s) 14 can be integrally formed within the target zone TZ to have a V-shaped line configuration as exemplarily illustrated in FIG. 4. Or, in various embodiments, the rib(s) 14 can be integrally formed within the target zone TZ to have a honeycomb configuration as exemplarily illustrated in FIG. 5. Furthermore, as exemplarily illustrated in FIG. 7, the rib(s) can be integrally formed within the target zone TZ to have any height H and any width T that is designed to provide a particular desired amount of structural integrity, rigidity and stiffness to the main panel 16 such that the main panel 16 (i.e., the canopy 12) will not sag, bow, warp or otherwise deform due to exposure to changing environmental temperatures. For example, in various embodiments, the rib(s) can be integrally formed with the main panel 16 to have a height H that is approximately 1 to 8 times a nominal thickness P of the main panel 16 (e.g., 2 to 4 times the nominal thickness P of the main panel), and a thickness T that is approximately 0.25 to 1.5 times the nominal thickness P of the main panel 16 (e.g., 0.5 to 0.75 times the nominal thickness P).

Figure 6:
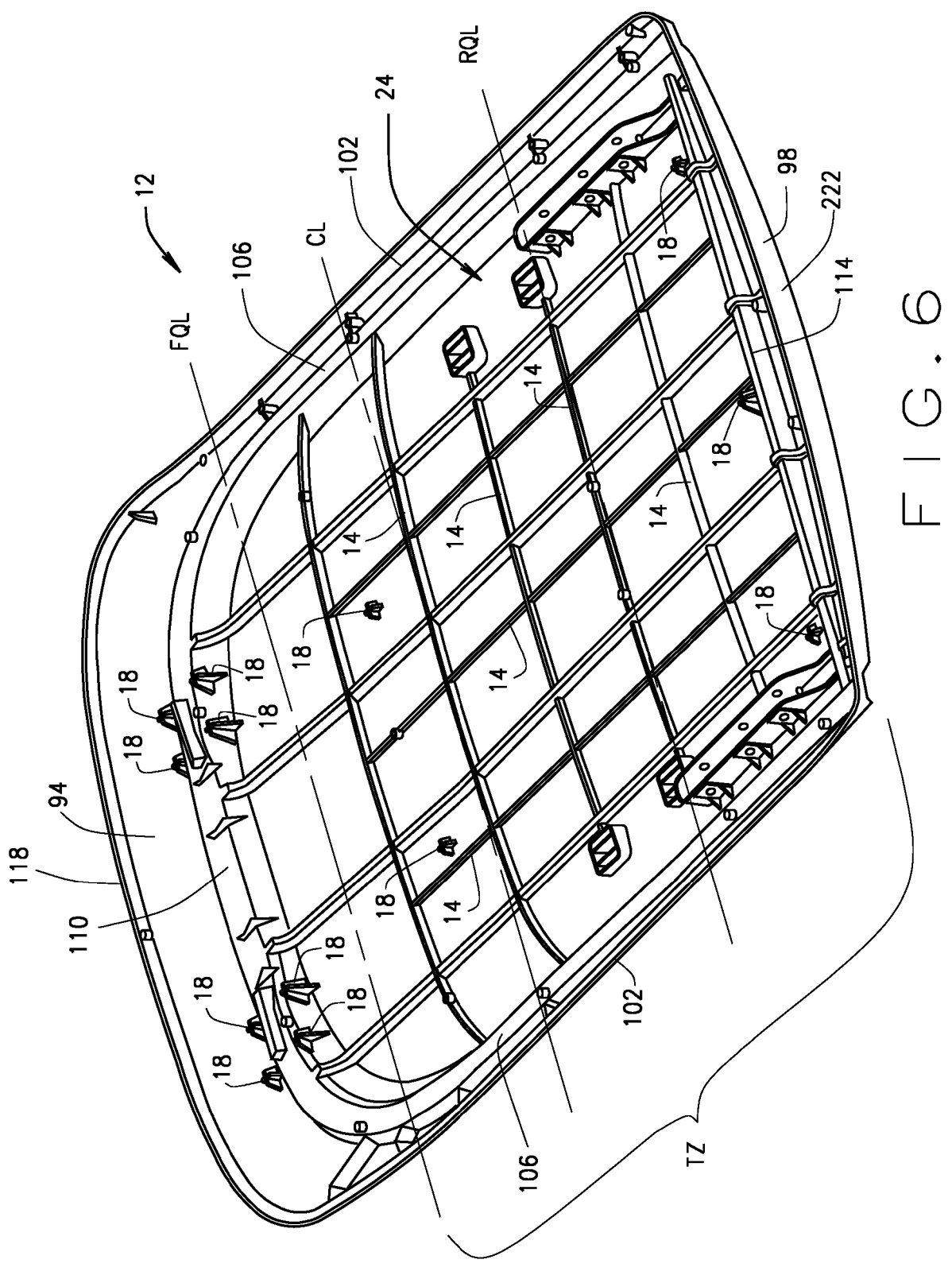
FIG. 6 is a view of an underside of the canopy exemplarily illustrating the support rib(s) in accordance with still yet other various embodiments of the present disclosure.

Referring particularly to FIG. 6, although the various figures exemplarily illustrate the support rib(s) 14 extending laterally across a width of the canopy 12, in various embodiments the canopy 12 can comprise one or more support rib(s) 14 integrally formed with the main panel 16 and extending longitudinally along a length of canopy main panel 16. Additionally, in various embodiments, the canopy 12 can comprise a plurality of support rib(s) 14 integrally formed with the main panel 16 and extending both laterally across the width of the canopy main panel 16 and longitudinally along the length of canopy main panel 16.

Referring now to FIG. 8, as described above, in various embodiments, the canopy 12 can comprise a plurality of integrally formed accessory mounting bosses 18 that are molded into, or otherwise integrally formed with, the main panel 16 of the canopy 12 and are structured and operable to provide an accurate location placement and connection means for accurately locating and mounting one or more accessory, such as a console 226, a headliner 230, and/or a light fixture 234 to the canopy 12 (i.e., to the main panel 16). Specifically, the bosses 18 are strategically located on and integrally formed with the canopy 12 at specifically determined locations whereby an accessory (e.g., console 226, headliner 230, and/or a light fixture 234 can be mounted to the canopy 12 to have a specific location and orientation. More specifically, the bosses 18 are located on and integrally formed with the canopy 12 at specific designed locations where the locations are designed to match or mate with mounting fixtures of the respective accessory.

The mounting fixtures can be any fixture structured and operable to assist in fastening the accessory to the canopy bosses 18 (i.e., to the canopy 12). For example the fixtures can be mounting orifices for use with plastite or other screws, whereby screws are inserted through the mounting orifices, received by, and threaded into the mating boss 18, or compressing fit pins that are integrally formed with the accessory, whereby selected bosses 18 receive the compression fit pins such that the accessory is snap connected with the bosses 18. Accordingly, the bosses 18 can have any desired size and shape and an internal cavity having any desired shape or geometry. For example the internal cavity of one or more of the bosses 18 can have a threaded internal cavity for receiving and mating with screws, and/or one or more of the bosses 18 can have a spherical internal cavity structured and operable to receive and mate with compressing fit pins integrally formed with the accessory or independent from the accessory, whereby they would be inserted through a mounting orifice and snapped into the respective bosses 18. Additionally, in various embodiments the canopy 12 can comprise bosses 18 that are formed at specific designed locations to be user accessible such that a vehicle user can selectively mount an accessory, e.g., as a speaker, to the canopy 12. In various embodiments, the bosses can be integrally formed and located along the support ribs 14 and/or any other desired location of the canopy 12.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A vehicle canopy, said canopy comprising:
a main panel having a top face and a bottom face;
a front wall extending from a front of the main panel;
a back wall extending from a rear of the main panel;
a pair of opposing sidewalls extending from opposing sides of the main panel; and
one or more support rib integrally formed with and disposed laterally across a bottom face of the main panel, the one or more support rib configured in a honeycomb webbing pattern comprising a plurality of cells, each cell having walls that define a hollow cavity, wherein the walls and hollow cavity of each cell extend substantially orthogonally from the bottom face of the main panel, the one or more support rib structured and operable to provide rigidity and stiffness to the main panel to prevent deformation of the main panel within a target zone.

2. The canopy of claim 1 further comprising a plurality of bosses integrally formed with the bottom face of the main panel of the canopy, the bosses structured and operable to provide an accurate location placement and connection means for accurately locating and mounting one or more accessory to the canopy.

3. The canopy of claim 1, wherein the one or more support rib integrally formed with the main panel and extending laterally across the main panel are disposed within and extend laterally across a predetermined target zone of the main panel.

4. The canopy of claim 3, wherein the target zone is located between a longitudinal center line of the main panel and a longitudinal rear quarter line of the main panel.

5. The canopy of claim 3, wherein the target zone is located between a longitudinal front quarter line of the main panel and the back wall of the canopy.

6. The canopy of claim 3, wherein the target zone is located between a longitudinal center line of the main panel and the back wall of the canopy.

7. The canopy of claim 1 further comprising at least one support rib integrally formed with the main panel and disposed longitudinally along the main panel and within the target zone.

8. A canopy system for a vehicle, said canopy system comprising
at least one front strut;
at least one rear strut; and
a canopy that is mountable to the at least one front strut and the at least one rear strut, wherein the canopy comprises:
a main panel having a top face and a bottom face;
a front wall extending from a front of the main panel;
a back wall extending from a rear of the main panel;
a pair of opposing sidewalls extending from opposing sides of the main panel; and
one or more support rib integrally formed with and disposed laterally across a bottom face of the main panel, the one or more support rib configured in a honeycomb webbing pattern comprising a plurality of cells, each cell having walls that define a hollow cavity, wherein the walls and hollow cavity of each cell extend substantially orthogonally from the bottom face of the main panel, the one or more support rib structured and operable to provide rigidity and stiffness to the main panel to prevent deformation of the main panel within a target zone.

9. The system of claim 8 further comprising a plurality of bosses integrally formed with the bottom face of the main panel of the canopy, the bosses structured and operable to provide an accurate location placement and connection means for accurately locating and mounting one or more accessory to the canopy.

10. The system of claim 8, wherein the one or more support rib integrally formed with the main panel and extending laterally across the main panel are disposed within and extend laterally across a predetermined target zone of the main panel.

11. The system of claim 10, wherein the target zone is located between a longitudinal center line of the main panel and a longitudinal rear quarter line of the main panel.

12. The system of claim 10, wherein the target zone is located between a longitudinal front quarter line of the main panel and the back wall of the canopy.

13. The system of claim 10, wherein the target zone is located between a longitudinal center line of the main panel and the back wall of the canopy.

14. The system of claim 8 further comprising at least one support rib integrally formed with the main panel and disposed longitudinally along the main panel and within the target zone.

15. A vehicle, said vehicle comprising;
a chassis;
a plurality of wheels operatively connected to the chassis;
a passenger compartment supported by the chassis; and
a canopy system structured and operable to protect passengers of the vehicle from rain, water and sunlight, said canopy system comprising:
at least one front strut;
at least one rear strut; and
a canopy that is mountable to the at least one front strut and the at least one rear strut, wherein the canopy comprises:
a main panel having a top face and a bottom face;
a front wall extending from a front of the main panel;
a back wall extending from a rear of the main panel;

a pair of opposing sidewalls extending from opposing sides of the main panel;

one or more support rib integrally formed with and disposed laterally across a bottom face of the main panel, the one or more support rib configured in a honeycomb webbing pattern comprising a plurality of cells, each cell having walls that define a hollow cavity, wherein the walls and hollow cavity of each cell extend substantially orthogonally from the bottom face of the main panel, the one or more support rib structured and operable to provide rigidity and stiffness to the main panel to prevent deformation of the main panel within a target zone; and a plurality of bosses integrally formed with the bottom face of the main panel of the canopy, the bosses structured and operable to provide an accurate location placement and connection means for accurately locating and mounting one or more accessory to the canopy.

\* \* \* \* \*